United States Patent
Liu et al.

(10) Patent No.: US 11,313,575 B2
(45) Date of Patent: Apr. 26, 2022

(54) NETWORKING METHOD AND APPARATUS FOR AIR CONDITIONING UNIT, AND TERMINAL

(71) Applicant: Gree Electric Appliances, Inc. of Zhuhai, Guangdong (CN)

(72) Inventors: Hua Liu, Guangdong (CN); Qunbo Liu, Guangdong (CN); Jie Tang, Guangdong (CN); Longfei Li, Guangdong (CN); Yi Ni, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 17/007,276

(22) Filed: Aug. 31, 2020

(65) Prior Publication Data
US 2020/0400332 A1    Dec. 24, 2020

Related U.S. Application Data

(63) Continuation-in-part of application No. PCT/CN2018/120651, filed on Dec. 12, 2018.

(30) Foreign Application Priority Data

Mar. 2, 2018   (CN) .......................... 201810176113.5

(51) Int. Cl.
*F24F 11/58* (2018.01)
*F24F 11/65* (2018.01)
(Continued)

(52) U.S. Cl.
CPC .............. *F24F 11/58* (2018.01); *F24F 11/61* (2018.01); *F24F 11/65* (2018.01); *G05B 19/042* (2013.01);
(Continued)

(58) Field of Classification Search
CPC .. F24F 11/58; F24F 11/65; F24F 11/61; F24F 2140/12; F24F 2110/12; F24F 11/64;
(Continued)

(56) References Cited

U.S. PATENT DOCUMENTS 6,290,141 B1     9/2001  Park et al.
2013/0019622 A1* 1/2013  Nakashima ............. F25B 13/00
                                                         62/160
(Continued)

FOREIGN PATENT DOCUMENTS

CN    104968028 A    10/2015
CN    105509224 A    4/2016
(Continued)

*Primary Examiner* — Charles R Kasenge
(74) *Attorney, Agent, or Firm* — The Webb Law Firm (57) ABSTRACT

The present disclosure discloses a networking method device and terminal for an air conditioning unit. The networking method includes: detecting an outside ambient temperature after a target networking indoor unit is started; determining a target operating mode of the target networking indoor unit according to the outside ambient temperature; detecting a system pressure value of a multi-split air conditioning system after an operating duration of the target networking indoor unit in the target operating mode is greater than a preset operating duration; and determining whether the target networking indoor unit belongs to a target networking system according to the system pressure value.

14 Claims, 4 Drawing Sheets

(51) Int. Cl.
 *F24F 11/61* (2018.01)
 *G05B 19/042* (2006.01)
 *F24F 140/12* (2018.01)
 *F24F 110/12* (2018.01)

(52) U.S. Cl.
 CPC ....... *F24F 2110/12* (2018.01); *F24F 2140/12* (2018.01); *G05B 2219/2614* (2013.01)

(58) Field of Classification Search
 CPC ........ F24F 11/49; F24F 11/57; F24F 2110/10; F24F 11/88; G05B 19/042; G05B 2219/2614
 See application file for complete search history.

(56) References Cited

U.S. PATENT DOCUMENTS

| | | | |
|---|---|---|---|
| 2013/0060386 | A1 | 3/2013 | Cha et al. |
| 2013/0220589 | A1* | 8/2013 | Liu .......................... F24F 11/83 165/253 |

FOREIGN PATENT DOCUMENTS

| | | |
|---|---|---|
| CN | 105953370 A | 9/2016 |
| CN | 106091261 A | 11/2016 |
| CN | 107036233 A | 8/2017 |
| CN | 107202402 A | 9/2017 |
| CN | 108562010 A | 9/2018 |
| CN | 108626860 A | 10/2018 |
| EP | 1302728 A1 | 4/2003 |
| JP | 200785673 | 4/2007 |

\* cited by examiner

NETWORKING METHOD AND APPARATUS FOR AIR CONDITIONING UNIT, AND TERMINAL

CROSS-REFERENCE TO RELATED APPLICATIONS

This application is a Continuation-in-part of International Application No. PCT/CN2018/120651 filed Dec. 12, 2018, and claims priority to Chinese Patent Application No. 201810176113.5 filed Mar. 2, 2018, the disclosures of which are hereby incorporated by reference in their entirety.

BACKGROUND OF THE INVENTION

Field of the Invention

The present disclosure relates to a networking method, device and terminal for an air conditioning unit.

Description of Related Art

The inventors of the present disclosure are aware of a related art. In the related art, thin copper wires (for example, ordinary sheathed twisted pair copper core wires) are generally used for connection between the indoor and outdoor units and between various indoor units of multi-split air conditioning system. However, the inventors realized that the implementation of communication between the indoor and outdoor units by thin copper wires is present with shortcomings such as complicated installation and wires suffering from bit by bugs and mice. The inventors of the present disclosure are aware of another related art. In the other related art, in order to simplify the installation, reduce the engineering installation workload and ensure the safety and reliability during use, the multi-split air conditioning system may perform control in a power line carrier communication manner. A major feature of the power line carrier communication is that there is no communication line in a traditional sense, but the power line is used for communication. The implementation of communication by the power line carrier may reduce a special provision of a communication line, so that the cost may be significantly reduced.

SUMMARY OF THE INVENTION

According to an aspect of embodiments of the present disclosure, a networking method for an air conditioning unit is provided. The networking method comprises: detecting an outside ambient temperature after a target networking indoor unit is started; determining a target operating mode of the target networking indoor unit according to the outside ambient temperature; detecting a system pressure value of a multi-split air conditioning system after an operating duration of the target networking indoor unit in the target operating mode is greater than a preset operating duration; and determining whether the target networking indoor unit belongs to a target networking system according to the system pressure value.

According to another aspect of embodiments of the present disclosure, a networking device of an air conditioning unit is provided. The networking device comprises: a first detecting circuit configured to detect an outside ambient temperature after a target networking indoor unit is started; a first determining circuit configured to determine a target operating mode of the target networking indoor unit according to the outside ambient temperature; a second detecting circuit configured to detect a system pressure value of a multi-split air conditioning system after an operating duration of the target networking indoor unit in the target operating mode is greater than a preset operating duration; and a second determining circuit configured to determine whether the target networking indoor unit belongs to a target networking system according to the system pressure value.

According to another aspect of embodiments of the present disclosure, a terminal is also provided. The terminal comprises: a memory, and a processor coupled to the memory, the memory communicating with the processor through a bus system. The memory is configured to store a program which when executed by the processor controls a device where the memory is located to perform any networking method for the air conditioning unit described above, and the processor is configured to run a program which when run performs any networking method for the air conditioning unit described above.

BRIEF DESCRIPTION OF THE DRAWINGS

The accompanying drawings described herein are used to provide a further understanding of the present disclosure and constitute a part of the present disclosure. The illustrative embodiments of the present disclosure as well as the illustrations thereof, which are used for explaining the present disclosure, do not constitute improper limitation of the present disclosure. In the accompanying drawings.

DESCRIPTION OF THE INVENTION

In order to make those skilled in the art better understand the solution of the present disclosure, the technical solution in the embodiments of the present disclosure may be explicitly and completely described below in conjunction with the accompanying drawings in the embodiments of the present disclosure. Obviously, the described embodiments are merely part of the embodiments of the present disclosure, rather than all the embodiments. On the basis of the embodiments of the present disclosure, all the other embodiments acquired by those skilled in the art on the premise that no inventive effort is involved should fall into the protection scope of the present disclosure.

It should be noted that the terms "first", "second" and the like in the specification and claims of the present disclosure and the above-described accompanying drawings are used to distinguish similar objects, and are not necessarily used to describe a specific order or sequence. It is to be understood that the data thus used is interchangeable as appropriate, such that the embodiments of the present disclosure described here may be implemented, in a sequence other than those illustrated or described here. In addition, the terms "comprises" and "has" as well as any of their deformations are intended to cover a non-exclusive inclusion. For example, the process, method, system, product, or device that contains a series of steps or units is not necessarily limited to those steps or units that are explicitly listed, but may comprise other steps or units that are not explicitly listed or that are inherent to such processes, methods, products or devices.

The inventors of this disclosure have found when the power line carrier communication is used, the multi-split air conditioning system communication network is matched with a pipeline system. If they do not match with each other, it may result in that the system cannot be controlled normally. Secondly, if there are multiple sets of multi-split air conditioning systems using the power line carrier communication, since the same test manner is used, there may be a condition of a matching error between the pipeline system and the communication network. Take a system A: an outdoor unit A, an indoor unit A1, an indoor unit A2, an indoor unit A2 and a system B: an outdoor unit B, an indoor unit B1, an indoor unit B2, an indoor unit B2 for example to make an explanation. When the system A matches the communication network with the pipeline system, there may be a condition that the outdoor unit A searches the indoor units A1, A2, A3, B1, B2, B3 for pairing. Since the indoor units B1, B2, B3 do not belong to the system A, the matching of the communication network and the pipeline system is incorrect.

The following embodiments of the present disclosure may be applied to a multi-split air conditioning system. For example, the multi-split air conditioning system in the embodiments of the present disclosure is a multi-split air conditioning system using a power line carrier communication. For example, the multi-split air conditioning system comprises one or more sets of multi-split air conditioning networking systems. In some embodiments, each set of networking systems corresponds to one networking outdoor unit and a plurality of networking indoor units. In some embodiments, each networking outdoor unit corresponds to a plurality of networking indoor units in the present system. In some embodiments, both the networking outdoor unit and the networking indoor unit are an outdoor unit and an outdoor unit of the air conditioning system. The present disclosure does not limit the types and models of the networking indoor unit and the networking outdoor unit. However, during networking, each networking indoor unit may be identified and numbered, so that a networking indoor unit corresponding to each networking system is matched according to the following embodiments of the present disclosure.

According to some embodiments of the present disclosure, some embodiments of a networking method for an air conditioning unit is provided. It should be noted that the steps shown in the flowchart of the accompanying drawings may be executed in a computer system having, for example, a set of computer-executable instructions. Moreover, although a logical order is shown in the flowchart, in some cases, the steps shown or described may be performed in an order different from here.

Figure 1:
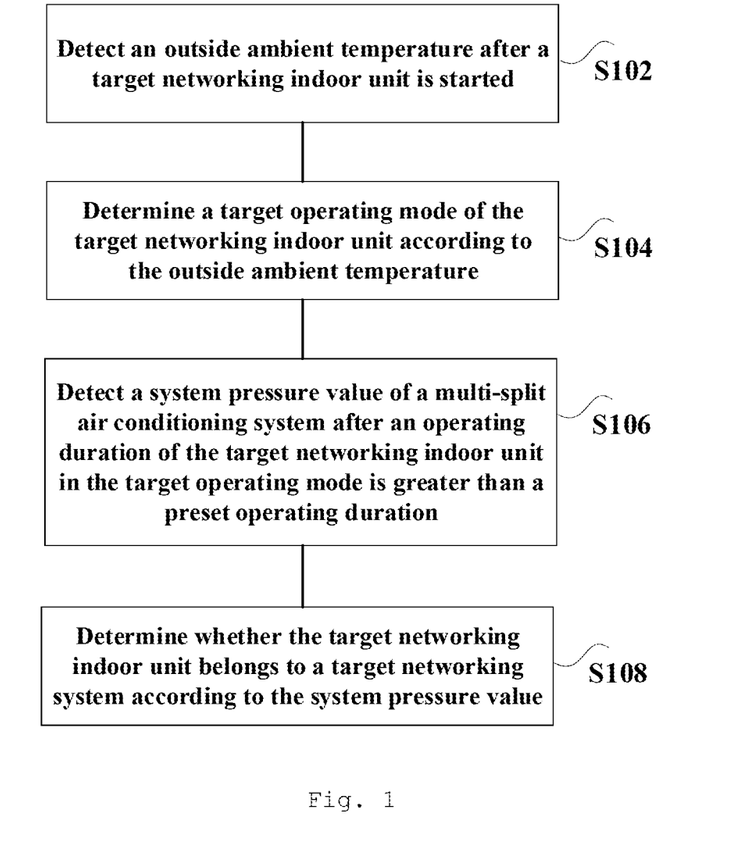
FIG. 1 is a flowchart of a networking method for an air conditioning unit according to some embodiments of the present disclosure.

The present disclosure will be described below in conjunction with some implementation steps. FIG. 1 is a flowchart of a networking method for an air conditioning unit according to some embodiments of the present disclosure. As shown in FIG. 1, the networking method comprises the following steps.

At step S102, an outside ambient temperature is detected after a target networking indoor unit is started.

In some embodiments, the networking method further comprises: determining the target networking system before the target networking indoor unit is started; obtaining a plurality of networking indoor units in the target networking system; starting a first networking indoor unit; and selecting the first networking indoor unit as the target networking indoor unit. That is, the networking indoor units are started one by one to sequentially detect whether each networking indoor unit belongs to the target networking system. After the detection is completed, the networking indoor unit is turned off, and then a next networking indoor unit is started, so as to determine a system to which each networking indoor unit belongs sequentially. In some embodiments, the target networking systems of the present disclosure comprises one or more sets of target networking systems. For example, the networking system comprises a system. A and a system B. The system A comprises an outdoor unit A, an indoor unit A1, an indoor unit A2, and an indoor unit A3, and the system B comprises an outdoor unit B, an indoor unit B1, an indoor unit B2, and an indoor unit B3. During networking, it is necessary to establish networking between the outdoor unit A and the indoor unit A1, the indoor unit A2 and the indoor unit A3, and establish networking between the outdoor unit B and the indoor unit B1, the indoor unit B2 and the indoor unit B3. At this time, it is necessary to first determine an indoor unit in the system A, that is, it is necessary to determine that the indoor unit A1, the indoor unit A2, and the indoor unit A3 belong to the system A (corresponding to a target network indoor unit). In some embodiments, the indoor unit A1, the indoor unit A2, the indoor unit A3, the indoor unit B1, the indoor unit B2 and the indoor unit B3 is selected as the target networking indoor unit sequentially, and then it is possible to determine whether the indoor units belongs to the system A sequentially (i.e., determining whether the target networking indoor unit belongs to the target networking system). The system. A and the system B may serve as the target networking system, and then the networking system is selected.

In some embodiments, after the target networking indoor unit that needs to be detected is determined, the outside ambient temperature is detected, and the started operating mode is determined according to the detected outside ambient temperature. That is, whether the operating mode is a cooling mode or a heating mode. Since the ambient temperature is different in different seasons, it is necessary to determine the operating mode of the started indoor unit for different ambient temperatures. In the embodiments of the present disclosure, the ambient temperature is detected by a temperature sensor provided in the outdoor unit or indoor unit of the air conditioner. In the present disclosure, there is no limitation on a specific ambient location, for example, outside an office or at a corridor.

At step S104, a target operating mode of the target networking indoor unit is determined according to the outside ambient temperature.

For the above-described step, the determining of the target operating mode of the target networking indoor unit according to the outside ambient temperature comprises: adjusting an operating mode of the target networking indoor unit to a first operating mode in a case where the outside ambient temperature is greater than or equal to a preset ambient temperature; and adjusting the operating mode of the target networking indoor unit to a second operating mode in a case where the outside ambient temperature is less than the preset ambient temperature.

In some embodiments, the first operating mode is an air conditioning cooling mode, and the second operating mode is an air conditioning heating mode. For the case where the outside ambient temperature is greater than or equal to the preset ambient temperature, for example, the detected outdoor ambient temperature is greater than the preset ambient temperature, a cooling treatment is required. At this time, the cooling mode of the indoor unit is started for cooling. When the outside ambient temperature is less than the preset ambient temperature, a heating treatment is required, that is, the ambient temperature is low at this time, and the heating mode of the indoor unit needs to be started. The above-described preset ambient temperature is not specifically limited in the present disclosure, for example, it is 15 degrees Celsius or 20 degrees Celsius.

At step S106, a system pressure value of a multi-split air conditioning system is detected after an operating duration of the target networking indoor unit in the target operating mode is greater than a preset operating duration.

For the above-described step, the operating duration of the target networking indoor unit in the target operating mode is detected after the target operating mode is determined. The system pressure value of the multi-split air conditioning system is detected after it is detected that the operating duration exceeds the preset operating duration. In some embodiments, the preset operating duration is determined according to a historical operating duration. In the present disclosure, there is no specific limitation on the preset operating duration that is set. For example, the preset operating duration is set to 25 minutes.

In some embodiments, the system pressure value in the embodiments of the present disclosure is a pressure value of the outdoor unit or a pressure value of the indoor unit. The system pressure value of the multi-split air conditioning system is detected by using a pressure sensor (such as a low pressure sensor or a high pressure sensor) to detect a pressure value on an exhaust side, so as to obtain the system pressure value of the multi-split air conditioning system. For example, a low pressure value of the multi-split air conditioning system (which refers to a pressure on the suction side of a compressor of the multi-split air conditioning system) is detected by the low pressure sensor, or a high pressure value of the multi-split air conditioning system (which refers to a pressure on an exhaust side of the compressor of the multi-split air conditioning system) is detected by the high pressure sensor.

At step S108, whether the target networking indoor unit belongs to a target networking system is determined according to the system pressure value.

In some embodiments, when the operating mode of the target networking indoor unit is adjusted to the second operating mode, the determining of whether the target networking indoor unit belongs to the target networking system according to the system pressure value comprises: detecting whether the system pressure value is greater than or equal to a first preset threshold; determining that the target networking indoor unit belongs to the target networking system when the system pressure value is greater than or equal to the first preset threshold; and determining that the target networking indoor unit does not belong to the target networking system when the system pressure value is less than the first preset threshold.

That is, whether the target networking indoor unit belongs to the target networking system is determined by the detected system pressure value, for example, whether the above-described the indoor unit A1 belongs to the system A is detected. After the system pressure value is determined, in the case of operating in the second operating mode which is the heating mode, the compressor of the air conditioner is in the suction state at this time so that the detected system pressure value (i.e., the pressure on the suction side of the compressor of the air conditioner) is in such a state as to continue to decrease. If it is determined that the pressure value of the system in the low-pressure state is greater than or equal to the first preset threshold after the operation reaches the preset operating duration, it means that the indoor unit belongs to the target networking system. If it is determined that the pressure value of the system in the low pressure state is less than the first preset threshold, it means that the indoor unit does not belong to the target networking system.

In other embodiments, when the operating mode of the target networking indoor unit is adjusted to the first operating mode, the determining of whether the target networking indoor unit belongs to the target networking system according to the system pressure value comprises: detecting whether the system pressure value is less than or equal to a second preset threshold; determining that the target networking indoor unit belongs to the target networking system when the system pressure value is less than or equal to the second preset threshold; and determining that the target networking indoor unit does not belong to the target networking system when the system pressure value is greater than the second preset threshold.

That is, when the operating mode of the target networking indoor unit is detected as the first operating mode which is the cooling mode at this time, the compressor of the air conditioning system is in an exhaust state so that the system pressure value is in such a state as to rise continuously (i.e., the high pressure state of the system). After the operating duration is greater than the preset operating duration, whether the system pressure value at this time is less than or equal to the second preset threshold is detected. If it is detected that the system pressure value is less than or equal to the second preset threshold, it is determined that the target networking indoor unit belongs to the target networking system.

For the first preset threshold and the second preset threshold, there is no specific limitation in the present disclosure. In some embodiments, the first preset threshold and the second preset threshold are determined according to historical pressure parameters in actual work.

By the above-described steps, after a target networking indoor unit is started, the outside ambient temperature is detected, an operating mode of the networking indoor unit is determined according to the detected outside ambient temperature, the system pressure value of the multi-split air conditioning system is detected after the operating duration of the operating mode is greater than a preset operating duration, and whether the target networking indoor unit belongs to the target networking system is determined according to the detected system pressure value. In this embodiment, it is detected whether the networking indoor unit belongs to its corresponding target networking system. In this way, after the networking indoor units are detected one by one, the indoor units in each network system are determined, thereby solving the problem that the networking indoor units in each system cannot be accurately matched, which results in a mistake in matching the multi-split air conditioning system communication network with the pipeline system, and achieving the effect that each communication networking system in the multi-split air conditioning system rapidly and correctly matches a corresponding networking indoor unit.

In some embodiments, the networking method further comprises: turning off the target networking indoor unit after determining whether the target networking indoor unit belongs to the target networking system; and starting a second networking indoor unit, wherein the second networking indoor unit is a networking indoor unit next to the first networking indoor unit. In some embodiments of the present disclosure, the above-described method of starting the indoor unit are repeatedly performed. That is, after the first networking indoor unit is started, if it is determined whether the indoor unit belongs to the target networking system, the networking indoor unit is turned off, and a next networking indoor unit is started, thereby sequentially determining a system corresponding to each networking indoor unit, and accurately determining a networking system to which each networking indoor unit belongs.

In some embodiments, the networking method further comprises marking a networking indoor unit belonging to the target networking system with a first identification information after determining that the target networking indoor unit belongs to the target networking system. In some embodiments, the networking method further comprises marking a networking indoor unit that does not belong to the target networking system with a second identification information after determining that the target networking indoor unit does not belong to the target networking system. In some embodiments, after determining whether the target networking indoor unit belongs to or does not belong to the target networking system, an identified networking indoor unit belonging to the target networking system is also determined according to the first identification information when the target networking indoor unit is redetermined; and the networking indoor unit that does not belong to the target networking system is selected as the target networking indoor unit according to the second identification information.

That is, the networking indoor units that have been determined to belong to the target networking system is marked with the first identification information, and the networking indoor units that do not belong to the target networking system is marked with the second identification information. In this way, when the networking indoor unit is determined next time, the indoor units marked with the second identification information are selected, and the networking indoor units are sequentially selected, so that the system of the networking indoor units is rapidly matched, and a networking system to which each networking indoor unit belongs is determined.

By the above-described embodiments, the multi-split air conditioning communication network is matched with the multi-split air conditioning system to determine the system to which each air conditioning indoor unit (i.e., the networking indoor unit) belongs, thereby achieving the self-adaptive matching of the power line carrier communication network of the multi-split air conditioning system and the pipeline system, so that each indoor unit in the multi-split air conditioning system rapidly and accurately matches a corresponding networking system (i.e., the multi-split air conditioning system).

The present disclosure will be described below in conjunction with other embodiments.

Figure 2:
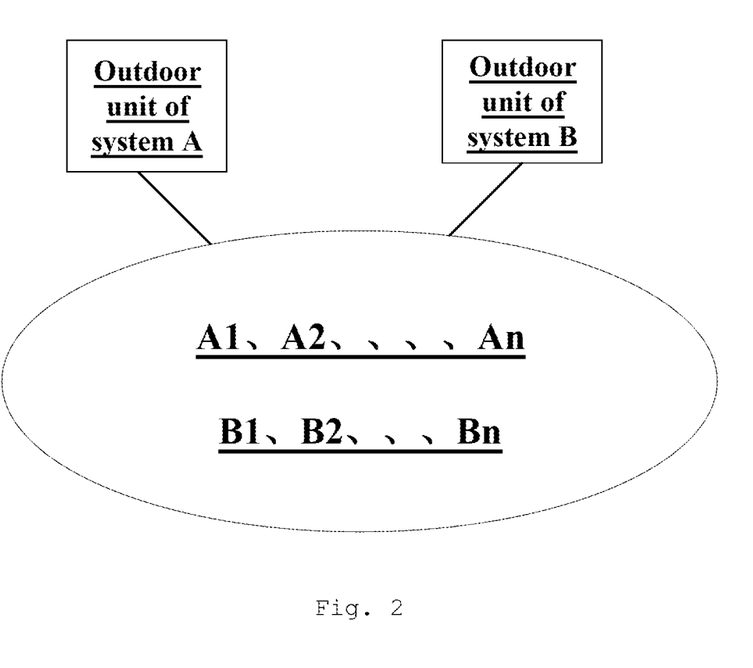
FIG. 2 is a schematic view of a networking system for an air conditioning unit according to some embodiments of the present disclosure.
Figure 3:
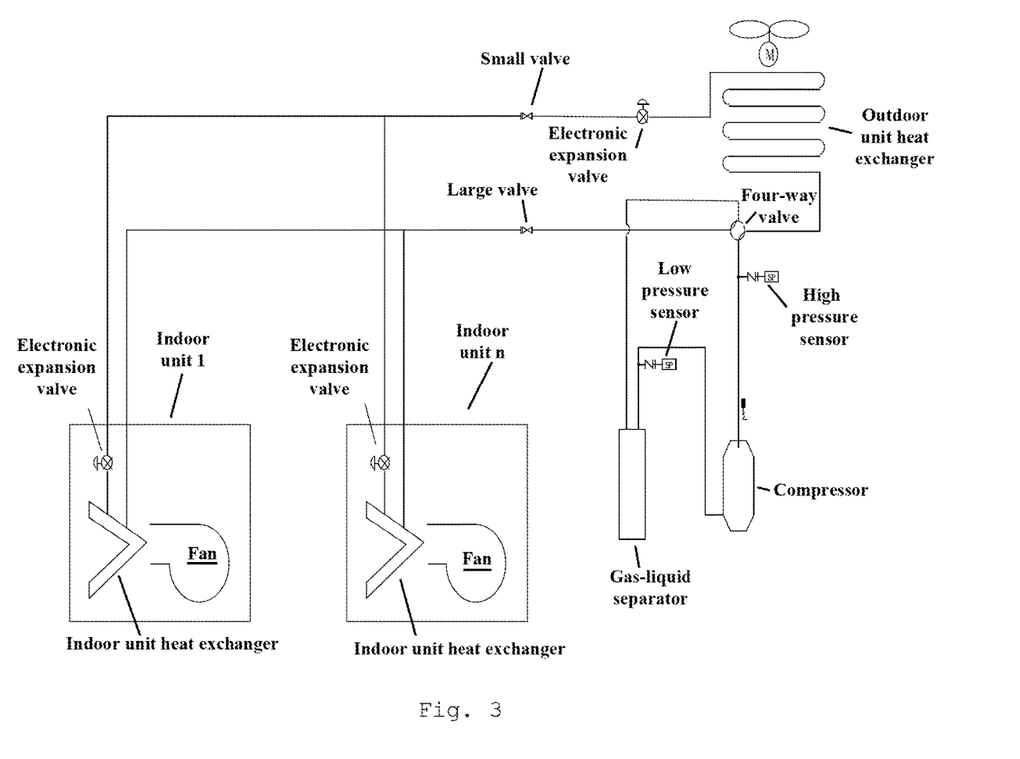
FIG. 3 is a schematic view of a multi-split air conditioner according to some embodiments of the present disclosure.

FIG. 2 is a schematic view of a networking system of an air conditioning unit according to some embodiments of the present disclosure. For example, as shown in FIG. 2, the system comprises N systems, each of which comprises one system outdoor unit and a plurality of system indoor units. FIG. 2 shows that the system A comprises an system outdoor unit A and an indoor unit A1, an indoor unit A2 . . . an indoor unit An, and also shows that the system B comprises a system outdoor unit B and an indoor unit B1, an indoor unit B2 . . . an indoor unit Bn. The internal composition of each multi-split air conditioning system is shown in FIG. 3. FIG. 3 is a schematic view of a multi-split air conditioner according to some embodiments of the present disclosure. As shown in FIG. 3, the multi-split air conditioner comprises an indoor unit 1 . . . an indoor unit n, and each indoor unit comprises at least an electronic expansion valve, an indoor unit heat exchanger, and a fan. The multi-split air conditioner also comprises an outdoor unit heat exchanger. The outdoor unit heat exchanger is connected to different valves (such as a small valve and a large valve in FIG. 3) and electronic expansion valves. The multi-split air conditioner also comprises a gas-liquid separator, a compressor and a four-way valve. A low pressure sensor is connected between the gas-liquid separator and the compressor, and a high pressure sensor is connected between the four-way valve and the compressor.

The operation process of the multi-split air conditioning communication self-adaptive networking technology in the embodiments of the present disclosure is as follows:

In some embodiments, one or more multi-split air conditioning power line carrier communications are detected by and paired with each other. In this embodiment, the system A and the system B (corresponding to the above-described networking system) serve as examples for explanation.

11. The communication network is matched for the system A (corresponding to the above-described target networking system). The system A detects that the indoor units contain the indoor units A1, A2 . . . An, B1, B2 . . . Bn of the systems A and B.

12. The indoor units are started one by one for judgment. For example, the indoor unit A1 (corresponding to the above-described target networking indoor unit) is started.

13. When the ambient temperature H≥X° C. (the ambient temperature H: a detected temperature of the return air temperature of the indoor unit, that is, the above-described detected outside ambient temperature is greater than a preset ambient temperature) is detected, the indoor unit A1 operates in a cooling mode (corresponding to the first operating mode). Whether the high pressure Pg (Pg: the pressure on the exhaust side of the compressor of the multi-split air conditioning system) of multi-split air conditioning system is less than or equal to a is detected (that is, whether the system pressure value is less than or equal to the second preset threshold is detected) after an operating duration of t (i.e., the above-described preset operating duration). If so, it is determined that the indoor unit belongs to the system A, and the indoor unit is marked to belong to the system A. If not, it is marked that the indoor unit does not belong to the system A.

14. When the ambient temperature H<X ° C. is detected, the indoor unit A1 operates in the heating mode. It is detected that whether the low pressure Pd (Pd: a pressure on the suction side of the compressor of the multi-split air conditioning system) of the multi-split air conditioning system is greater than or equal to b is detected (that is, whether the system pressure value is greater than or equal to the first preset threshold is detected) after an operating duration of t. If not, it is marked that the indoor unit does not belong to the system A. The values of X, t, a, and b in the embodiments of the present disclosure are artificially numerical values. In some embodiments, these values are obtained by experiments in a laboratory.

15. After the indoor unit A1 is turned off, the indoor unit A2 is started to determine whether the indoor unit A2 belongs to the system A in the same method. The indoor units detected by the system A are started and determined one by one to make the communication networking of the system A successfully achieved.

Then, the same operation is performed for the system B, as follows:

16. When the system B is subjected to communication networking, the system B detects that the indoor units contain the indoor units A1, A2 . . . An, B1, B2 . . . Bn of the systems A and B. The indoor units that have been marked as belonging to the system A are excluded, and the indoor units is no longer determined when the system B is subjected to communication networking.

17. The indoor units are started one by one for determining. For example, the indoor unit B1 is started.

18. When the ambient temperature H≥X° C. is detected, the indoor unit B1 operates in a cooling mode. Whether the high voltage Pg of the multi-split air conditioning system is less than or equal to a is detected after the operating duration of t. If so, it is determined that the indoor unit belongs to the system B and is thus marked. If not, it is determined that the indoor unit does not belong to the system A, and is thus marked.

19. When the ambient temperature H<X° C. is detected, the indoor unit B1 operates in a heating mode. Whether the low pressure Pd of multi-split air conditioning system is greater than or equal to b after the operating duration of t. If so, it is determined that the indoor unit belongs to the system B, and is thus marked. If not, it is determined that the indoor unit does not belong to the system B, and is thus marked.

20. After the indoor unit B1 is turned off, the indoor unit B2 is started to determine whether the indoor unit B2 belongs to the system B using the same method. The indoor units (the indoor units marked as belonging to another system are excluded) detected by the system B are started, and determined one by one to make the communication networking of the system B successfully achieved.

21. If the number of indoor units in the communication network of each system is inconsistent with the number of indoor units in the pipeline system after the communication self-adaptive matching of the systems A and B, the indoor units are searched again for matching and marking until they are correctly matched.

In some embodiments of the present disclosure, the multi-split air conditioning system having a power line carrier communication is used. For example, there are one or more sets of such multi-split air conditioning systems. The indoor units A1, A2 . . . An, B1, B2 . . . Bn detected by the outdoor unit of the system A are detected by such a control method for matching the multi-split air conditioning communication network with the system. For the detected indoor units, the indoor units are started one by one to perform a cooling (or heating) mode. After the operating duration of t, it is determined whether the high pressure Pg of the multi-split air conditioning system is less than or equal to a (or whether the low pressure Pd of the multi-split air conditioning system is greater than or equal to b). If so, it is determined that the indoor unit belongs to the system A, and is thus marked that the indoor unit belongs to the system A. If not, it is determined that the indoor unit does not belong to the system A, and is thus marked that the indoor unit does not belong to the system A. Then, the indoor unit is turned off. The indoor units are turned on one by one for detection and determining, so as to match the communication network of the system A.

In some embodiments, the present disclosure neither limits the number of communication networking systems, nor limits the number of the networking indoor units in each networking system. For example, two or more multi-split air conditioning communication systems are detected by and paired with each other. For example, the two or more systems comprise systems A, B, C . . . , wherein each system contains indoor units 1, 2 . . . n.

By the above-described embodiments, the power line carrier communication network of the multi-split air conditioning system and the pipeline system perform self-adaptive matching to solve the problem of the power line carrier communication of the multi-split air conditioning system being matched with the pipeline, so that the indoor units in the multi-split air conditioning system rapidly and correctly match the corresponding multi-split air conditioning system.

Figure 4:
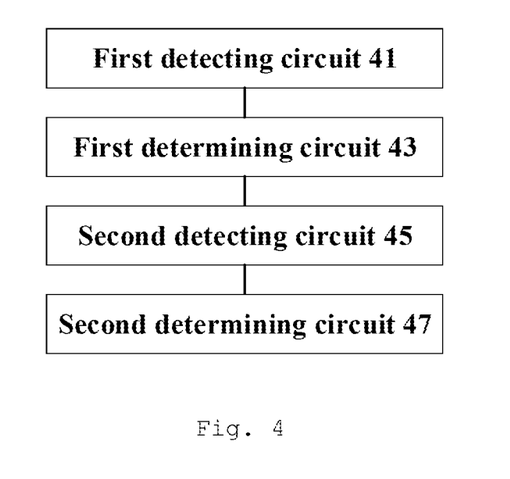
FIG. 4 is a schematic view of a networking device for an air conditioning unit according to some embodiments of the present disclosure.

FIG. 4 is a schematic view of a networking device for an air conditioning unit according to some embodiments of the present disclosure. As shown in FIG. 4, the device comprises: a first detecting circuit 41 configured to detect an outside ambient temperature after a target networking indoor unit is started; a first determining circuit 43 configured to determine a target operating mode of the target networking indoor unit according to the outside ambient temperature; a second detecting circuit 45 configured to detect a system pressure value of a multi-split air conditioning system after an operating duration of the target networking indoor unit in the target operating mode is greater than a preset operating duration; and a second determining circuit 47 configured to determine whether the target networking indoor unit belongs to a target networking system according to the system pressure value.

In the above-described embodiments of the device, the outside ambient temperature is detected by the first detecting circuit 41 after the target networking indoor unit is started, the operating mode of the networking inner unit is determined by the first determining circuit 43 according to the detected outside ambient temperature; the system pressure value of the multi-split air conditioning system is detected by the second detecting circuit 45 after the operating duration of the operating mode is greater than the preset operating duration, and then whether the target networking indoor unit belongs to a target networking system is determined by the second determining circuit 47 according to the detected system pressure value. In this embodiment, whether the networking indoor unit belongs to its corresponding target networking system is detected. In this way, after the networking indoor units are detected one by one, each networking indoor unit in each network system is determined, thereby solving the problem that the networking indoor units in each system cannot be accurately matched, which results in a mistake in matching the multi-split air conditioning system communication network with the pipeline system, and achieving the effect that each communication networking system in the multi-split air conditioning system rapidly and correctly matches a corresponding networking indoor unit.

In some embodiments, the first determining circuit 41 comprises: a first adjusting sub-circuit configured to adjust an operating mode of the target networking indoor unit to a first operating mode in a case where the outside ambient temperature is greater than or equal to a preset ambient temperature; and a second adjusting sub-circuit configured to adjust the operating mode of the target networking indoor unit to a second operating mode in a case where the outside ambient temperature is less than the preset ambient temperature.

In some embodiments, the second determining circuit 45 comprises: a first detecting sub-circuit configured to detect whether the system pressure value is greater than or equal to a first preset threshold when the operating mode of the target networking indoor unit is adjusted to the second operating mode; a first determining sub-circuit configured to determine that the target networking indoor unit belongs to the target networking system when the system pressure value is greater than or equal to the first preset threshold; and a second determining sub-circuit configured to determine that the target networking indoor unit does not belong to the target networking system when the system pressure value is less than the first preset threshold.

In some embodiments, the second determining circuit 45 further comprises: a second detecting sub-circuit configured to detect whether the system pressure value is less than or equal to a second preset threshold when the operating mode of the target networking indoor unit is adjusted to the first operating mode; a third determining sub-circuit configured to determine that the target networking indoor unit belongs to the target networking system when the system pressure value is less than or equal to the second preset threshold; and a fourth determining sub-circuit configured to determine that the target networking indoor unit does not belong to the target networking system when the system pressure value is greater than the second preset threshold.

In some embodiments, the networking device further comprises a first marking circuit configured to mark a networking indoor unit belonging to the target networking system with a first identification information after determining that the target networking indoor unit belongs to the target networking system. The networking device further comprises a second marking circuit configured to mark a networking indoor unit that does not belong to the target networking system with a second identification information after determining that the target networking indoor unit does not belong to the target networking system.

In some embodiments, the networking device further comprises: a third determining circuit configured to determine an identified networking indoor unit belonging to the target networking system according to the first identification information when the target networking indoor unit is redetermined, after determining whether the target networking indoor unit belongs to or does not belong to the target networking system; and a selecting circuit configured to select the networking indoor unit that does not belong to the target networking system as the target networking indoor unit according to the second identification information.

Figure 5:
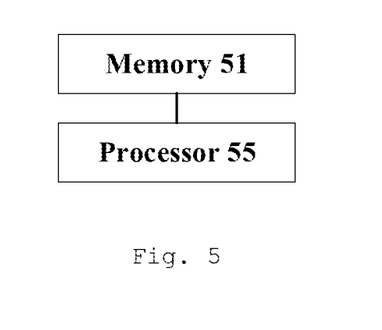
FIG. 5 is a schematic view of a terminal according to some embodiments of the present disclosure.

FIG. 5 is a schematic view of a terminal according to some embodiments of the present disclosure. As shown in FIG. 5, the terminal comprises: a memory 51, and a processor 55 coupled to the memory. The memory communicates with the processor through a bus system. The memory is configured to store a program, wherein the program when executed by the processor controls a device where the memory is located to perform any networking method for the air conditioning unit described above. The processor is configured to run the program, wherein the program when run performs any networking method for the air conditioning unit described above.

In some embodiments, when the above-described processor runs the program, the programs of the following method steps are performed: detecting an outside ambient temperature after a target networking indoor unit is started; determining a target operating mode of the target networking indoor unit according to the outside ambient temperature; detecting a system pressure value of a multi-split air conditioning system after an operating duration of the target networking indoor unit in the target operating mode is greater than a preset operating duration; and determining whether the target networking indoor unit belongs to a target networking system according to the system pressure value.

In some embodiments, when the above-described processor runs the program, an operating mode of the target networking indoor unit is adjusted to a first operating mode in a case where the outside ambient temperature is greater than or equal to a preset ambient temperature; and the operating mode of the target networking indoor unit is adjusted to a second operating mode in a case where the outside ambient temperature is less than the preset ambient temperature.

In some embodiments, when the above-described processor runs the program, in the case where the operating mode of the target networking indoor unit is adjusted to the second operating mode, whether the system pressure value is greater than or equal to a first preset threshold is detected; it is determined that the target networking indoor unit belongs to the target networking system when the system pressure value is greater than or equal to the first preset threshold; and it is determined that the target networking indoor unit does not belong to the target networking system when the system pressure value is less than the first preset threshold.

In some embodiments, when the above-described processor runs the program, in the case where the operating mode of the target networking indoor unit is adjusted to the first operating mode, whether the system pressure value is less than or equal to a second preset threshold is detected; it is determined that the target networking indoor unit belongs to the target networking system when the system pressure value is less than or equal to the second preset threshold; and it is determined that the target networking indoor unit does not belong to the target networking system when the system pressure value is greater than the second preset threshold.

In some embodiments, when the above-described processor runs the program, a networking indoor unit belonging to the target networking system is marked with a first identification information. After determining that the target networking indoor unit does not belong to the target networking system, the networking method further comprises marking a networking indoor unit that does not belong to the target networking system with a second identification information.

In some embodiments, when the above-described processor runs the program, an identified networking indoor unit belonging to the target networking system is determined according to the first identification information when the target networking indoor unit is redetermined; and the networking indoor unit that does not belong to the target networking system is selected as the target networking indoor unit according to the second identification information.

In some embodiments, when the above-described processor runs the program, the target networking system is determined before the target networking indoor unit is started; a plurality of networking indoor units in the target networking system are obtained; a first networking indoor unit is started; and the first networking indoor unit is selected as the target networking indoor unit; the target networking indoor unit is turned off after determining whether the target networking indoor unit belongs to the target networking system; and a second networking indoor unit is started, wherein the second networking indoor unit is a networking indoor unit next to the first networking indoor unit.

The serial numbers of the above-described embodiments of the present disclosure which are for description only, do not represent the advantages and disadvantages of the embodiments.

In the above-described embodiments of the present disclosure, there is a respective emphasized description for each embodiment. For apart that is not detailed in a certain embodiment, it is possible to refer to the related descriptions of other embodiments.

In several embodiments provided in the present disclosure, it should be understood that the disclosed technical content may be implemented in other ways. The embodiments of the device described above are only schematic. For example, the division of the unit may be a logical function division. In actual implementation, there may be another division manner. For example, a plurality of units or components may be combined or integrated into another system, or some features may be ignored, or not be implemented. In addition, the mutual coupling or direct coupling or communication connection as displayed or discussed may be indirect coupling or communication connection through some interfaces, units or modules, and may be in electrical or other forms.

The units described as separate members may or may not be physically separated. The members displayed as units may or may not be physical units, that is, they may be located in one place, or may be distributed on a plurality of units. Some or all of the units therein may be selected according to actual needs to achieve the purpose of the solution of the present embodiment.

In addition, each functional unit in some embodiments of the present disclosure may be integrated into one processing unit, or each unit may also exist alone physically, or two or more units may be integrated into one unit. The above-described integrated unit may be implemented in the form of hardware or a software functional unit.

If the integrated unit is implemented in the form of a software functional unit and sold or used as an independent product, it may be stored in a computer-readable storage medium. Based on such understanding, the technical solution of the present disclosure substantially or the portion contributing to the method known or an entirety or part of the technical solution may be embodied in the form of a software product. The computer software product which is stored in a storage medium comprises several instructions to make a computer device (which may be a personal computer, server, network device or the like) perform all or some of the steps of the methods described in various embodiments of the present disclosure. The storage medium described previously comprise: various media that may store program codes such as U disk, read-only memory (ROM), random access memory (RAM), mobile hard disk, magnetic disk or optical disk.

The above descriptions are only some embodiments of the present disclosure. It should be noted that: those skilled in the art may also make several improvements and refinements without departing from the principles of the present disclosure, and these modifications and refinements are also considered to be within the protection scope of the present disclosure.

INDUSTRIAL APPLICABILITY

The solution provided by the embodiments of the present disclosure is used to determine whether the target networking indoor unit belongs to the target networking system. In the technical solution provided by some embodiments of the present disclosure, the multi-split air conditioning system comprises one or more sets of multi-split air conditioning networking systems. Each set of networking systems may correspond to one networking outdoor unit and a plurality of networking indoor units. By detecting whether the networking indoor units belong to their corresponding target networking system, after the indoor units are detected one by one, each networking indoor unit in each networking system is determined, thereby solving the technical problem that the networking indoor units in each system cannot be accurately matched, which results in a mistake in matching the multi-split air conditioning system communication network with the pipeline system, and achieving the effect that each communication networking system within the multi-split air conditioning system rapidly and correctly matches a corresponding networking indoor unit.

What is claimed is:

1. A networking method for an air conditioning unit, comprising:
    detecting an outside ambient temperature after a target networking indoor unit is started;
    determining a target operating mode of the target networking indoor unit according to the outside ambient temperature;
    detecting a system pressure value of a multi-split air conditioning system after an operating duration of the target networking indoor unit in the target operating mode is greater than a preset operating duration; and
    determining whether the target networking indoor unit belongs to a target networking system according to the system pressure value;
    wherein the determining of the target operating mode of the target networking indoor unit according to the outside ambient temperature comprises: adjusting an operating mode of the target networking indoor unit to a first operating mode in a case where the outside ambient temperature is greater than or equal to a preset ambient temperature; and adjusting the operating mode of the target networking indoor unit to a second operating mode in a case where the outside ambient temperature is less than the preset ambient temperature;
    wherein when the operating mode of the target networking indoor unit is adjusted to the second operating mode, the determining of whether the target networking indoor unit belongs to the target networking system according to the system pressure value comprises:
    detecting whether the system pressure value is greater than or equal to a first preset threshold;
    determining that the target networking indoor unit belongs to the target networking system when the system pressure value is greater than or equal to the first preset threshold; and
    determining that the target networking indoor unit does not belong to the target networking system when the system pressure value is less than the first preset threshold.

2. The networking method according to claim 1, wherein when the operating mode of the target networking indoor unit is adjusted to the first operating mode, the determining of whether the target networking indoor unit belongs to the target networking system according to the system pressure value comprises:
    detecting whether the system pressure value is less than or equal to a second preset threshold;
    determining that the target networking indoor unit belongs to the target networking system when the system pressure value is less than or equal to the second preset threshold; and determining that the target networking indoor unit does not belong to the target networking system when the system pressure value is greater than the second preset threshold.

3. The networking method according to claim 2, further comprises:

marking a networking indoor unit belonging to the target networking system with a first identification information after determining that the target networking indoor unit belongs to the target networking system; and marking a networking indoor unit that does not belong to the target networking system with a second identification information after determining that the target networking indoor unit does not belong to the target networking system.

4. The networking method according to claim 1, further comprises:

marking a networking indoor unit belonging to the target networking system with a first identification information after determining that the target networking indoor unit belongs to the target networking system; and marking a networking indoor unit that does not belong to the target networking system with a second identification information after determining that the target networking indoor unit does not belong to the target networking system.

5. The networking method according to claim 4, wherein after determining whether the target networking indoor unit belongs to or does not belong to the target networking system, the networking method further comprises:

determining an identified networking indoor unit belonging to the target networking system according to the first identification information when the target networking indoor unit is redetermined; and selecting the networking indoor unit that does not belong to the target networking system as the target networking indoor unit according to the second identification information.

6. The networking method according to claim 1, further comprises:

determining the target networking system before the target networking indoor unit is started;

obtaining a plurality of networking indoor units in the target networking system;

starting a first networking indoor unit;

selecting the first networking indoor unit as the target networking indoor unit;

turning off the target networking indoor unit after determining whether the target networking indoor unit belongs to the target networking system; and starting a second networking indoor unit, wherein the second networking indoor unit is a networking indoor unit next to the first networking indoor unit.

7. The networking method according to claim 1, wherein the first operating mode is an air conditioning cooling mode, and the second operating mode is an air conditioning heating mode.

8. The networking method according to claim 7, wherein:

the system pressure value is a pressure on an exhaust side of a compressor corresponding to the target networking indoor unit in a case where the operating mode of the target networking indoor unit is adjusted to the first operating mode; and the system pressure value is a pressure on a suction side of the compressor corresponding to the target networking indoor unit in a case where the operating mode of the target networking indoor unit is adjusted to the second operating mode.

9. A non-transitory computer-readable storage medium having computer program instructions stored thereon, wherein the instructions when executed by a processor implement the networking method for the air conditioning unit according to claim 1.

10. A networking device for an air conditioning unit, comprising:

a first detecting circuit configured to detect an outside ambient temperature after a target networking indoor unit is started;

a first determining circuit configured to determine a target operating mode of the target networking indoor unit according to the outside ambient temperature;

a second detecting circuit configured to detect a system pressure value of a multi-split air conditioning system after an operating duration of the target networking indoor unit in the target operating mode is greater than a preset operating duration; and a second determining circuit configured to determine whether the target networking indoor unit belongs to a target networking system according to the system pressure value;

wherein the first determining circuit comprises:

a first adjusting sub-circuit configured to adjust an operating mode of the target networking indoor unit to a first operating mode in a case where the outside ambient temperature is greater than or equal to a preset ambient temperature; and a second adjusting sub-circuit configured to adjust the operating mode of the target networking indoor unit to a second operating mode in a case where the outside ambient temperature is less than the past ambient temperature; and the second determining circuit comprises:

a first detecting sub-circuit configured to detect whether the system pressure value is greater than or equal to a first preset threshold when the operating mode of the target networking indoor unit is adjusted to the second operating mode;

a first determining sub-circuit configured to determine that the target networking indoor unit belongs to the target networking system when the system pressure value is greater than or equal to the first present threshold; and a second determining sub-circuit configured to determine that the target networking indoor unit does not belong to the target networking system when the system pressure value is less than the first preset threshold.

11. A terminal, comprising:

a memory, and a processor coupled to the memory, the memory communicating with the processor through a bus system, wherein:

the memory is configured to store a program, and the processor is configured to run the program which when run performs a networking method for the air conditioning unit comprising:

detecting an outside ambient temperature after a target networking indoor unit is started;

determining a target operating mode of the target networking indoor unit according to the outside ambient temperature;

detecting a system pressure value of a multi-split air conditioning system after an operating duration of the target networking indoor unit in the target operating mode is greater than a preset operating duration; and determining whether the target networking indoor unit belongs to a target networking system according to the system pressure value;

wherein the processor is further configured to adjust an operating mode of the target networking indoor unit to a first operating mode in a case where the outside ambient temperature is greater than or equal to a present ambient temperature, and adjust the operating mode of the target networking indoor unit to a second operating mode in a case where the outside ambient temperature is less than the preset ambient temperature; and the processor is further configured to detect whether the system pressure value is greater than or equal to a first preset threshold when the operating mode of the target networking indoor unit is adjusted to the second operating mode, determine that the target networking indoor unit belongs to the target networking system when the system pressure value is greater than or equal to the first preset threshold, and determine that the target networking indoor unit does not belong to the target networking system when the system pressure value is less than the first preset threshold.

12. The terminal according to claim 11, wherein the processor is further configured to detect whether the system pressure value is less than or equal to a second preset threshold when the operating mode of the target networking indoor unit is adjusted to the first operating mode, determine that the target networking indoor unit belongs to the target networking system when the system pressure value is less than or equal to the second preset threshold, and determine that the target networking indoor unit does not belong to the target networking system when the system pressure value is greater than the second preset threshold.

13. The terminal according to claim 11, wherein the processor is further configured to mark a networking indoor unit belonging to the target networking system with a first identification information after determining that the target networking indoor unit belongs to the target networking system, and mark a networking indoor unit that does not belong to the target networking system with a second identification information after determining that the target networking indoor unit does not belong to the target networking system.

14. The terminal according to claim 11, wherein the processor is further configured to determine an identified networking indoor unit belonging to the target networking system according to the first identification information when the target networking indoor unit is redetermined, and select the networking indoor unit that does not belong to the target networking system as the target networking indoor unit according to the second identification information.

* * * * *

UNITED STATES PATENT AND TRADEMARK OFFICE
CERTIFICATE OF CORRECTION

| | | |
|---|---|---|
| PATENT NO. | : 11,313,575 B2 | Page 1 of 1 |
| APPLICATION NO. | : 17/007276 | |
| DATED | : April 26, 2022 | |
| INVENTOR(S) | : Hua Liu et al. | |

It is certified that error appears in the above-identified patent and that said Letters Patent is hereby corrected as shown below:

On the Title Page

Column 2, Item (57) Abstract, Line 1, delete "method" and insert -- method, --

In the Claims

Column 16, Line 36, Claim 10, delete "past" and insert -- preset --

Column 17, Line 10, Claim 11, delete "present" and insert -- preset --

Signed and Sealed this
Twenty-eighth Day of June, 2022

Katherine Kelly Vidal
*Director of the United States Patent and Trademark Office*